(12) United States Patent  (10) Patent No.: US 8,132,815 B1
Dillon                     (45) Date of Patent:     Mar. 13, 2012

(54) CARD SEAL FOR A TURBINE

(75) Inventor: Daniel R Dillon, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 343 days.

(21) Appl. No.: 12/561,858

(22) Filed: Sep. 17, 2009

(51) Int. Cl.
*F16J 15/02* (2006.01)
(52) U.S. Cl. .......................................................... 277/355
(58) Field of Classification Search .................... 277/355
See application file for complete search history.

(56) References Cited

U.S. PATENT DOCUMENTS

| 6,162,014 | A  | * | 12/2000 | Bagepalli et al. | 415/170.1 |
| 6,742,782 | B2 | * | 6/2004  | Beichl           | 277/409   |
| 7,631,879 | B2 | * | 12/2009 | Diantonio        | 277/416   |
| 7,828,297 | B2 | * | 11/2010 | Hoebel et al.    | 277/412   |
| 2008/0007009 | A1 | * | 1/2008 | Williams         | 277/355   |

\* cited by examiner

*Primary Examiner* — Vishal Patel

(74) *Attorney, Agent, or Firm* — John Ryznic

(57) ABSTRACT

A card seal with an annular arrangement of cards that form the card seal, where the cards each form an L-shape cross section with a wide front face and a narrow side face, where the side face has a constant width from a top end to a location greater than a mid-point, and from this point decreases in width to zero width at the bottom end. The side faces form a blockage against leakage flowing between adjacent cards in a cards seal assembly.

6 Claims, 1 Drawing Sheet

CARD SEAL FOR A TURBINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a dynamic seal, and more specifically to card seal for use in turbo machines such as gas turbines, steam turbines, compressors, pumps, etc.

2. Description of the Related Art Including Information Disclosed Under 37 CFR 1.97 and 1.98

A gas turbine engine includes a compressor and a turbine each having multiple rows of rotor blades interspaced between stator or guide vanes. In-between each row or stage, a large pressure differential is formed. In the compressor, the pressure increases in the flow direction while in the turbine the pressure decreases. The pressure differential between adjacent stages in the compressor is smaller than in the turbine because of the greater number of stages used in the compressor.

A dynamic seal is used between the rotor and the stator of the turbomachine to limit leakage in order to improve the efficiency of the turbo machine. In the turbine, the leakage is from the hot gas flow passing through the turbine. Hot gas leaking into the rim cavity will expose the rotor disks to the extreme hot temperature. Thus, better seals reduce leakage to increase performance of the turbo machine and to prevent over-exposure of turbomachine parts from excessive temperatures. In one example, the rotor disks in the turbine are made from a high strength material different than the rotor blades or stator vanes that would develop cracks due to thermal stress loads if exposed to high temperature from excessive hot gas leakage into the adjacent rim cavity. This is why purge air is often used in the rim cavities to push out or dilute and hot gas flow leakage that leaks through the dynamic seal and into the rim cavity.

In a turbine of a gas turbine engine, labyrinth seals or brush seals are used for the dynamic seals. In some cases, a combination of brush and labyrinth seals is used because of the characteristics of each. A labyrinth seal makes a good seal at relatively high rotational speeds while the brush seal is best for relatively low rotational speeds. This is due to the use of brushes that rub against the rotating part formed by the dynamic seal. As higher rotational speeds, the brushes will wear out early. Brush seals have less leakage than labyrinth seals, but wear out easily when rubbing at higher speeds. One reason why a turbine uses combinations of lab and brush seals is due to engine transients, which is when the engine is stopped and then restarted. The rotor shaft and the engine casing are made of different materials that have different coefficients of thermal expansion. Thus, the parts grow in a radial direction at different rates due to heat transfer to for from the part. Labyrinth seals are also capable of sealing much higher pressure differentials than brush seals.

A card seal is formed of a number of flat cards (also referred to as leafs or plates) arranged around a rotor shaft in an annular formation in which a gap formed between adjacent cards due to surface irregularities and is generally parallel to the rotor shaft axis. Each card is capable of sliding over adjacent cards so as to maintain contact with the rotor shaft surface or float on top thereof. An outer end of the cards is held in a casing while the inner ends float or make contact with the outer surface of the rotor shaft. One side of the cards is exposed to the high pressure side while the other side is exposed to the low pressure. U.S. Pat. No. 6,736,597 issued to Uehara et al on May 18, 2004 and entitled AXIS SEAL MECHANISM AND TURBINE shows one such card seal. This card seal will allow for too much leakage through the small gaps formed between adjacent cards to be useful in the gas turbine engine.

Leaf or card seals have been developed in order to provide a better seal that includes benefits from both the lab seals and the brush seals. Card seals are primarily utilized to maintain a pressure barrier between two cavities created by a static structure, a moving structure and separated by the seal structure as seen in FIG. 2 of the U.S. Pat. No. 6,736,597. Specifically, a static cylindrical case, a rotor and the seal. Whereas a solid seal structure—such as a ring seal—would undergo severe contact loads due to rotor lateral excursions, card seals are designed to be compliant and either tolerates small contact or bond out of the rotor path.

The prior art card seal structures includes a plurality of thin cards arranged so that the weak axis of bending is presented in the direction of rotor motion. A tilt or lean in direction of motion is included so that contact occurs at an angle to the direction of motion as seen in FIG. 3 of the U.S. Pat. No. 6,736,597. The net effect of these two features is to minimize wear by reduced contact load and actualize displacement due to boundary layer air pressure which will provide an air cushion between moving surface and free edge of the cards if a flexible card is used.

Therefore, by design, the plurality of cards that form the card seal provides for a direct leakage path between the cards as seen in FIG. 4 of the U.S. Pat. No. 6,736,597. For this reason, the cards are reinforced along the card longitudinal axis by either changing the card number density or forming a localized deformation such as dimpling or ridges on each thin card that align with each other. FIG. 5 of the U.S. Pat. No. 6,736,597 shows a card with a raised middle portion that extends along the longitudinal axis of the card that will reinforce the card and provide a barrier to the direct leakage flow path between the flat cards of FIG. 4. FIG. 6 of the U.S. Pat. No. 6,736,597 shows a side view of two adjacent cards each with a ridge projecting from one side of the thin card. The leakage area in this card seal is reduced by the cross sectional area of the ridge. However, the ridge or stamped process may effectively increase the weak axis inertia and impede the card's ability to bend away from the rotor lateral excursions. In other words, the cards having the ridges for added sealing and strength will produce a more rigid (or, less flexible) card seal.

BRIEF SUMMARY OF THE INVENTION

It is an object of the present invention to provide for a card seal with better leakage control through the cards than in the prior art card seals.

It is another object of the present invention to provide for a card seal that reduces the leakage flow path between the individual cards without a significant increase to overall card stiffness relative to the prior art card seals.

It is another object of the present invention to provide for a card seal that minimizes leakage while also minimizing stiffness of the Card geometry.

The above described objectives and more are achieved with the card seal of the present invention in which each card has L-shaped configuration when looking down the longitudinal axis of the card, where each card includes a rectangular shaped front face and a narrower side face, with the side face narrowing down to zero at the end that forms the sealing surface for the card. The narrow side face creates a seal between adjacent cards to prevent leakage through the spaces formed between cards in the card seal assembly.

DETAILED DESCRIPTION OF THE INVENTION

Figure 1:
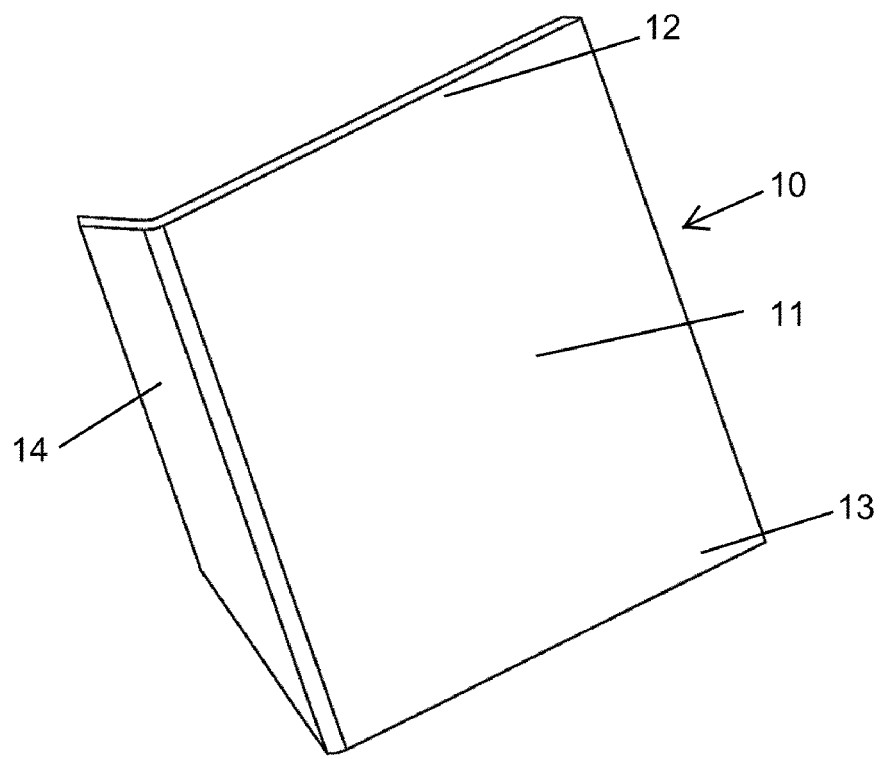
FIG. 1 shows an isometric view of a card of the card seal of the present invention.
Figure 2:
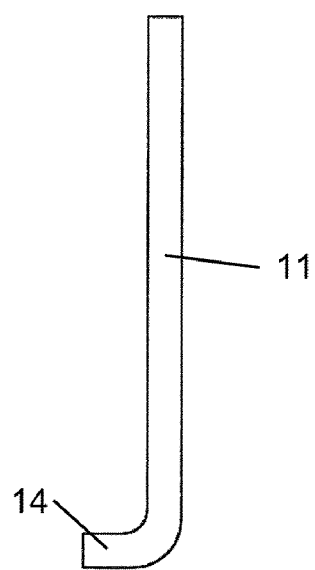
FIG. 2 shows a top view of several cards from the upper end.

The card or leaf seal of the present invention is shown in FIGS. 1 and 2 where in FIG. 1 the card seal is formed from several identical cards 10 each having a front face or side 11 that is rectangular in shape with an upper end that is secured to a card seal housing and a lower end 13 that forms a surface that forms the seal between the card and the rotating shaft. On one of the sides of the card is formed a side face 14 that has a width much less than the width of the front face 11. The side face 14 extends from the top end 12 to about one third the way to the lower end while having the same width. From this section, the side face narrows in width until it merges into the front face and has zero width. The side face 14 has about one tenth of the width of the front face 11.

The card 10 includes the side face 14 to block leakage flow between adjacent cards in the card seal assembly. The side face also adds stiffness to the card but because it narrows down to zero at the bottom end, the side face will still allow for flexibility of the card to operate as a card seal without being too rigid when riding or floating over the rotating surface on which the cards form the seal.

I claim the following:

1. A card seal comprising:
a card seal case secured to a stator;
a plurality of cards stacked against each other to form an annular arrangement around a rotor shaft; each card having a L-shaped cross sectional shape when viewed along a longitudinal axis of the card;
each card having a front face and a perpendicular side face;
said side face having a top end that meets a top end of the front face and a bottom end that meets a bottom end of the front face;
the side face having a narrow width with respect to the front face from a the top end of the side face to at least half the length of the side face with the remaining length of the side face tapering down to zero width at the bottom end of the side face.

2. The card seal of claim 1, and further comprising:
the front face of each card is rectangular in shape.

3. The card seal of claim 1, and further comprising:
the side face has a width of around one tenth of the width of the front face.

4. A card seal for sealing between a stator and rotor shaft comprising:
a plurality of cards stacked against each other to form an annular arrangement for surrounding said rotor shaft; each card having a L-shaped cross sectional shape when viewed along a longitudinal axis of the card;
each card having a front face and a perpendicular side face;
said side face having a top end that meets a top end of the front face and a bottom end that meets a bottom end of the front face;
the side face having a narrow width with respect to the front face from a the top end of the side face to at least half the length of the side face with the remaining length of the side face tapering down to zero width at the bottom end of the side face.

5. A card seal of claim 4, and further comprising:
the front face of each card is rectangular in shape.

6. The card seal of claim 4, and further comprising:
the side face has a width of around one tenth of the width of the front face.

\* \* \* \* \*